(12) United States Patent
Mortun

(10) Patent No.: US 12,222,760 B2
(45) Date of Patent: Feb. 11, 2025

(54) SYSTEM AND METHOD OF WIRELESS CHARGING

(71) Applicant: Hubbell Incorporated, Shelton, CT (US)

(72) Inventor: Sorin Mortun, Irvington, NY (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 16/204,091

(22) Filed: Nov. 29, 2018

(65) Prior Publication Data

US 2019/0165595 A1    May 30, 2019

Related U.S. Application Data

(60) Provisional application No. 62/598,614, filed on Dec. 14, 2017, provisional application No. 62/592,031, filed on Nov. 29, 2017.

(51) Int. Cl.
| | |
|---|---|
| *H02J 7/00* | (2006.01) |
| *G06F 1/16* | (2006.01) |
| *G06F 1/18* | (2006.01) |
| *G06F 1/26* | (2006.01) |
| *H02J 7/14* | (2006.01) |
| *H02J 50/80* | (2016.01) |

(52) U.S. Cl.
CPC ............ *G06F 1/1632* (2013.01); *G06F 1/182* (2013.01); *G06F 1/266* (2013.01); *H02J 7/0044* (2013.01); *H02J 7/0048* (2020.01); *H02J 50/80* (2016.02); *H02J 7/0049* (2020.01)

(58) Field of Classification Search
CPC .......... H02J 50/10; H02J 7/0042; H02J 7/025; H02J 7/0044; H02J 50/90; H02J 50/40; H02J 5/005

USPC ......................................................... 320/134
See application file for complete search history.

(56) References Cited

U.S. PATENT DOCUMENTS

| | | | |
|---|---|---|---|
| 6,864,798 B2 * | 3/2005 | Janik ................. | H01R 13/6675 340/693.11 |
| 7,654,855 B2 * | 2/2010 | Liao ....................... | H01R 13/60 439/441 |
| 7,772,802 B2 | 8/2010 | Manico et al. | |
| 7,812,257 B2 * | 10/2010 | Gunderman ............. | H02G 3/14 174/67 |
| 8,456,131 B2 * | 6/2013 | Bukow ................. | H02J 7/0044 320/113 |

(Continued)

FOREIGN PATENT DOCUMENTS

| | | |
|---|---|---|
| KR | 2015097887 A * | 8/2015 |
| KR | 20150097887 * | 8/2015 |

OTHER PUBLICATIONS

Foreign reference KR2015097887 (Year: 2015).*

(Continued)

*Primary Examiner* — Alexis B Pacheco
(74) *Attorney, Agent, or Firm* — Michael Best & Friedrich LLP

(57) ABSTRACT

A charging system including a housing, an indicator located on the housing, a power supply, and a controller. The power supply is located within the housing. The power supply is configured to wirelessly charge an external device. The controller is configured to determine a charging efficiency of the external device, and control the indicator based on the charging efficiency.

13 Claims, 10 Drawing Sheets

(56) References Cited

U.S. PATENT DOCUMENTS

| | | | |
|---|---|---|---|
| 9,065,263 B2* | 6/2015 | Porcano | H01R 13/447 |
| 9,490,649 B2 | 11/2016 | Moore | |
| 11,189,975 B1* | 11/2021 | Baldwin | H02G 3/14 |
| 2002/0191782 A1* | 12/2002 | Beger | H04B 1/3877 |
| | | | 379/454 |
| 2006/0196902 A1* | 9/2006 | Chen | A45F 5/02 |
| | | | 224/197 |
| 2007/0075679 A1* | 4/2007 | Ha | H04M 1/04 |
| | | | 320/114 |
| 2007/0094853 A1* | 5/2007 | Ferrari | A45F 5/02 |
| | | | 24/580.1 |
| 2007/0152633 A1* | 7/2007 | Lee | G06F 1/1632 |
| | | | 320/114 |
| 2009/0146608 A1 | 6/2009 | Lee | |
| 2010/0156343 A1* | 6/2010 | Jung | H02J 7/025 |
| | | | 320/108 |
| 2010/0201315 A1* | 8/2010 | Oshimi | H02J 7/0042 |
| | | | 320/108 |
| 2012/0139484 A1* | 6/2012 | Gunderman | H02J 50/80 |
| | | | 320/108 |
| 2012/0318941 A1* | 12/2012 | Gourley | H02J 5/00 |
| | | | 248/205.1 |
| 2013/0335037 A1 | 12/2013 | Park et al. | |
| 2014/0166333 A1* | 6/2014 | Porcano | H02G 3/14 |
| | | | 174/66 |
| 2014/0340033 A1 | 11/2014 | Kim et al. | |
| 2014/0354219 A1* | 12/2014 | Fan | H02J 50/12 |
| | | | 320/108 |
| 2015/0001265 A1* | 1/2015 | Hart | A45F 5/021 |
| | | | 224/269 |
| 2016/0141908 A1* | 5/2016 | Jakl | H02J 7/0004 |
| | | | 320/108 |
| 2016/0190853 A1* | 6/2016 | Yow | H02J 50/10 |
| | | | 320/108 |
| 2016/0254613 A1* | 9/2016 | Choi | H01R 13/5829 |
| | | | 439/31 |
| 2017/0025886 A1* | 1/2017 | Rohmer | H02J 7/0044 |
| 2017/0110902 A1* | 4/2017 | Miller | H02J 7/0044 |
| 2018/0109141 A1 | 4/2018 | Makwinski et al. | |

OTHER PUBLICATIONS

Kim (KR 2015-0097887) reference (Year: 2015).*
PCT/US2018/063003 International Search Report and Written Opinion dated Feb. 8, 2019 (15 pages).
PCT/US2018/063003 Supplementary European Search Report dated Jun. 28, 2021 (8 pages).

* cited by examiner

SYSTEM AND METHOD OF WIRELESS CHARGING

RELATED APPLICATIONS

This application claims the benefit to U.S. Provisional Patent Application No. 62/592,031, filed on Nov. 29, 2017, and U.S. Provisional Patent Application No. 62/598,614, filed on Dec. 14, 2017, the entire contents of both of which are incorporated herein by reference.

FIELD

Embodiments relate to wireless charging systems and methods.

SUMMARY

One embodiment provides charging system including a housing, an indicator located on the housing, a power supply, and a controller. The power supply is located within the housing. The power supply is configured to wirelessly charge an external device. The controller is configured to determine a charging efficiency of the external device, and control the indicator based on the charging efficiency.

Another embodiment provides a method of charging a device. The method including wirelessly charging a device, and sensing a characteristic when the device is charging. The method further includes determining a charging efficiency based on the characteristic, and outputting the charging efficiency.

Other aspects of the application will become apparent by consideration of the detailed description and accompanying drawings.

DETAILED DESCRIPTION

Before any embodiments of the application are explained in detail, it is to be understood that the application is not limited in its application to the details of construction and the arrangement of components set forth in the following description or illustrated in the following drawings. The application is capable of other embodiments and of being practiced or of being carried out in various ways.

Figure 1:
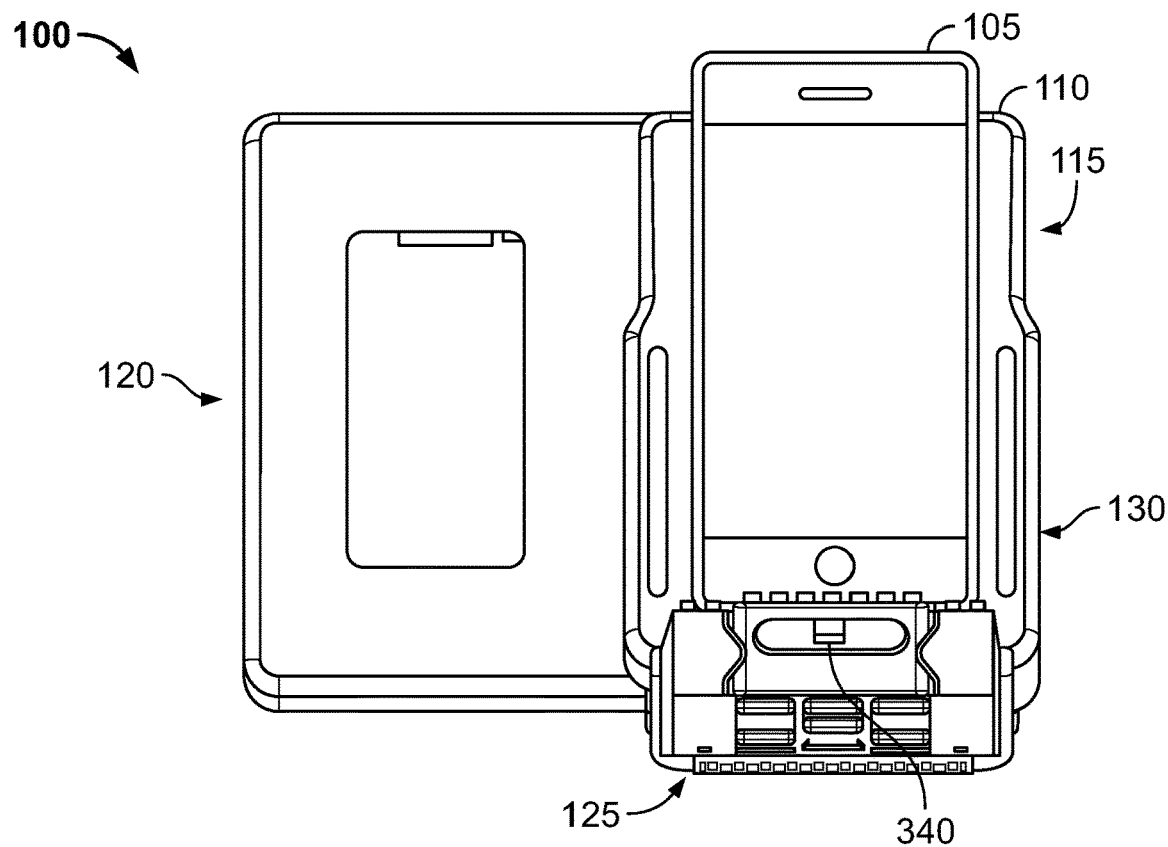
FIG. 1 is a front perspective view of a charging system configured to charge a device according to some embodiments.
Figure 2:
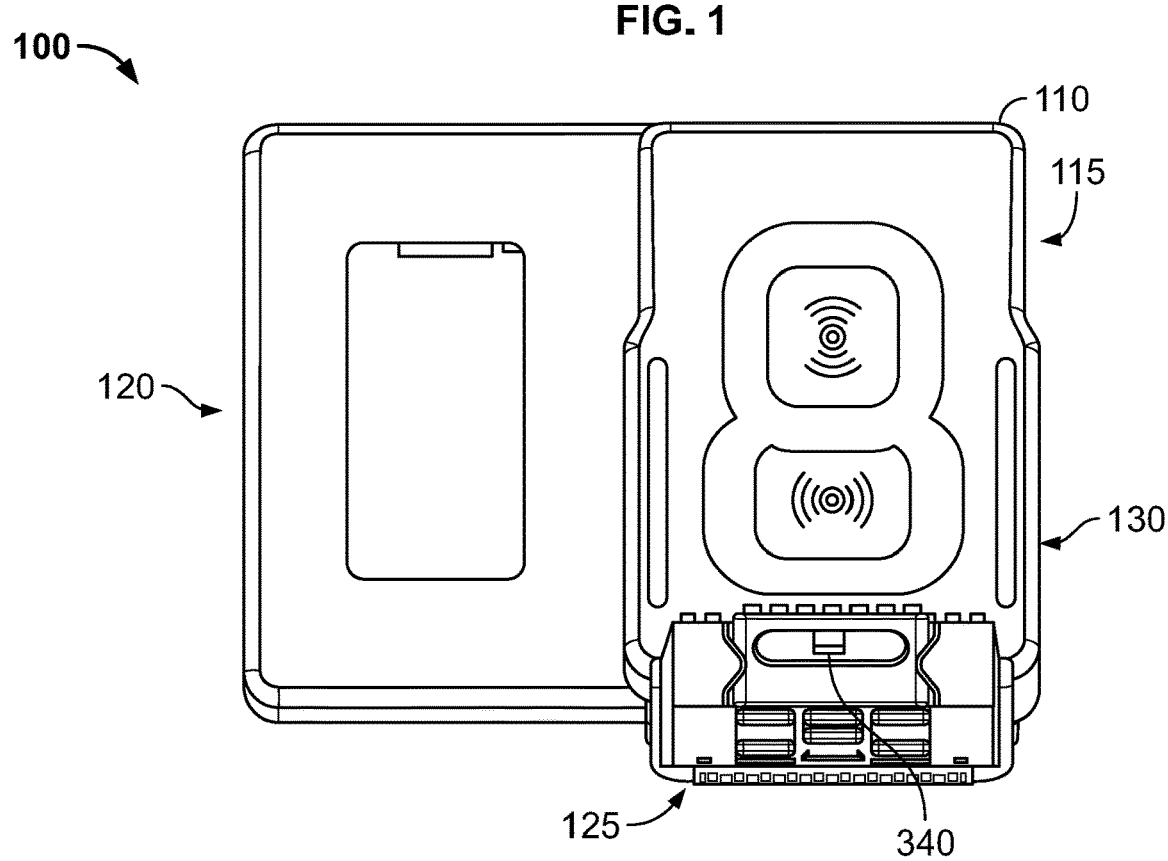
FIG. 2 is a front perspective view of the charging system of FIG. 1 with the device removed according to some embodiments.
Figure 3:
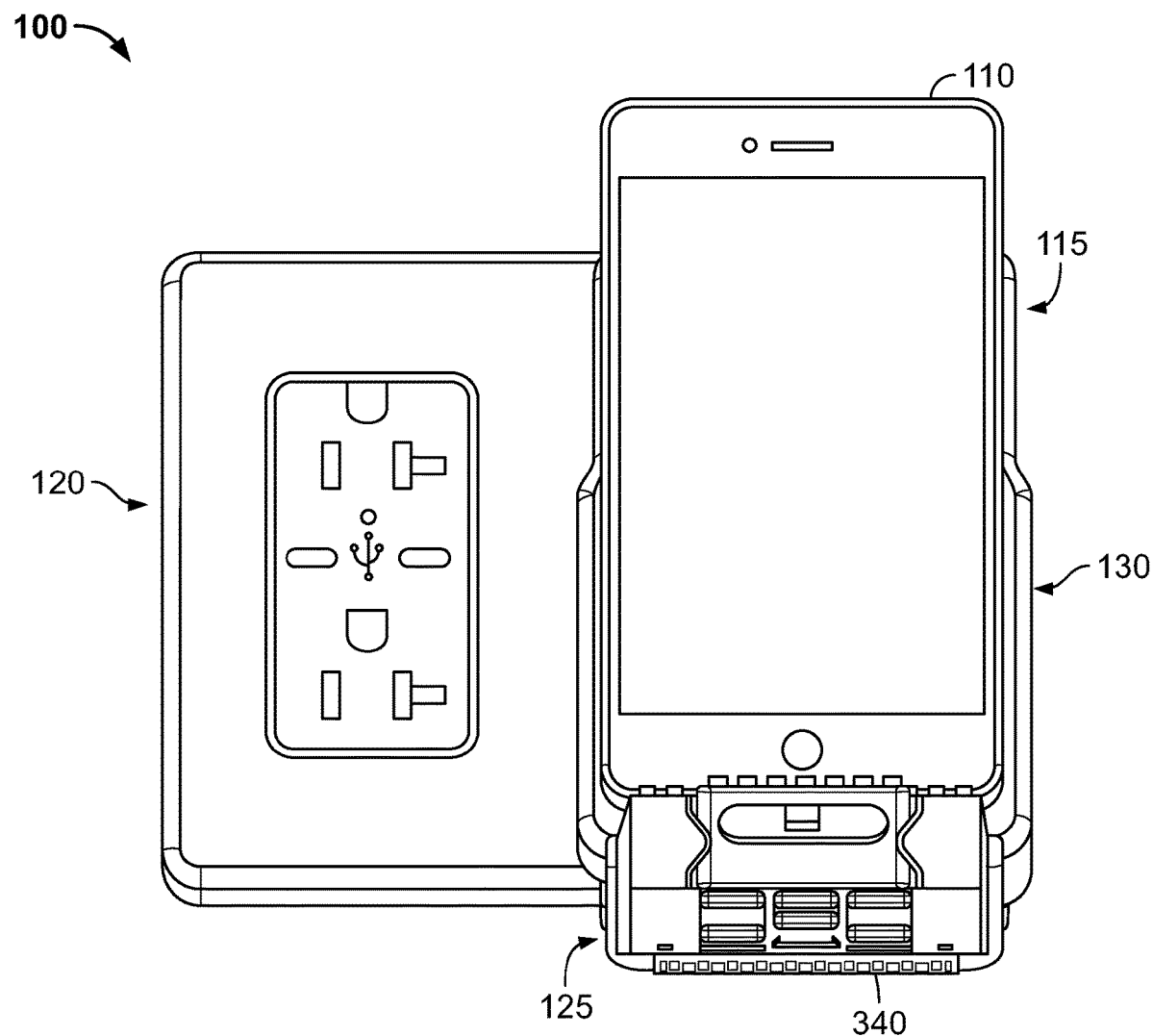
FIG. 3 is a front perspective view of the charging system including an outlet according to another embodiment.

FIGS. 1-3 are front views of a charging system 100 according to various embodiments. Charging system 100 is configured to receive and charge an external device 105 (for example, an external computer, a laptop, a tablet, a smartphone, a smart watch, etc.). In some embodiments, the charging system 100 is configured to wirelessly charge the external device 105.

The charging system 100 includes a housing 110. In the illustrated embodiment of FIG. 1, the housing 110 includes a receiving portion 115 and a receptacle portion 120. The receiving portion 115 is configured to receive and hold, or secure, the device 105. As illustrated, in some embodiments, the receiving portion 115 includes a shelf 125. The shelf 125 may project from a rear portion 130 of the receiving portion 115 and provide a surface for placement of the device 105. In some embodiment, the shelf 125 may project approximately perpendicular from the rear portion 130.

The receptacle portion 120 is configured to physically and/or electrically couple to a line power. As illustrated in FIG. 3, in some embodiments the receptacle portion 120 includes an outlet face 135. In the illustrated embodiments, the outlet face 135 is a duplex outlet face having a phase opening, a neutral opening, and a ground opening. In other embodiments, the outlet face 135 may be any NEMA standard outlet face, including but not limited to, a 5-15R outlet face, a 5-20R outlet face, 6-15R outlet face, and/or a 6-20R outlet face. In yet other embodiments, the outlet face 135 may be any non-NEMA standard outlet face. In yet other embodiments, the outlet face 135 may be, or may include, a Universal Serial Bus (USB) outlet (for example, a standard USB outlet and/or a mini-USB outlet).

Figure 4:
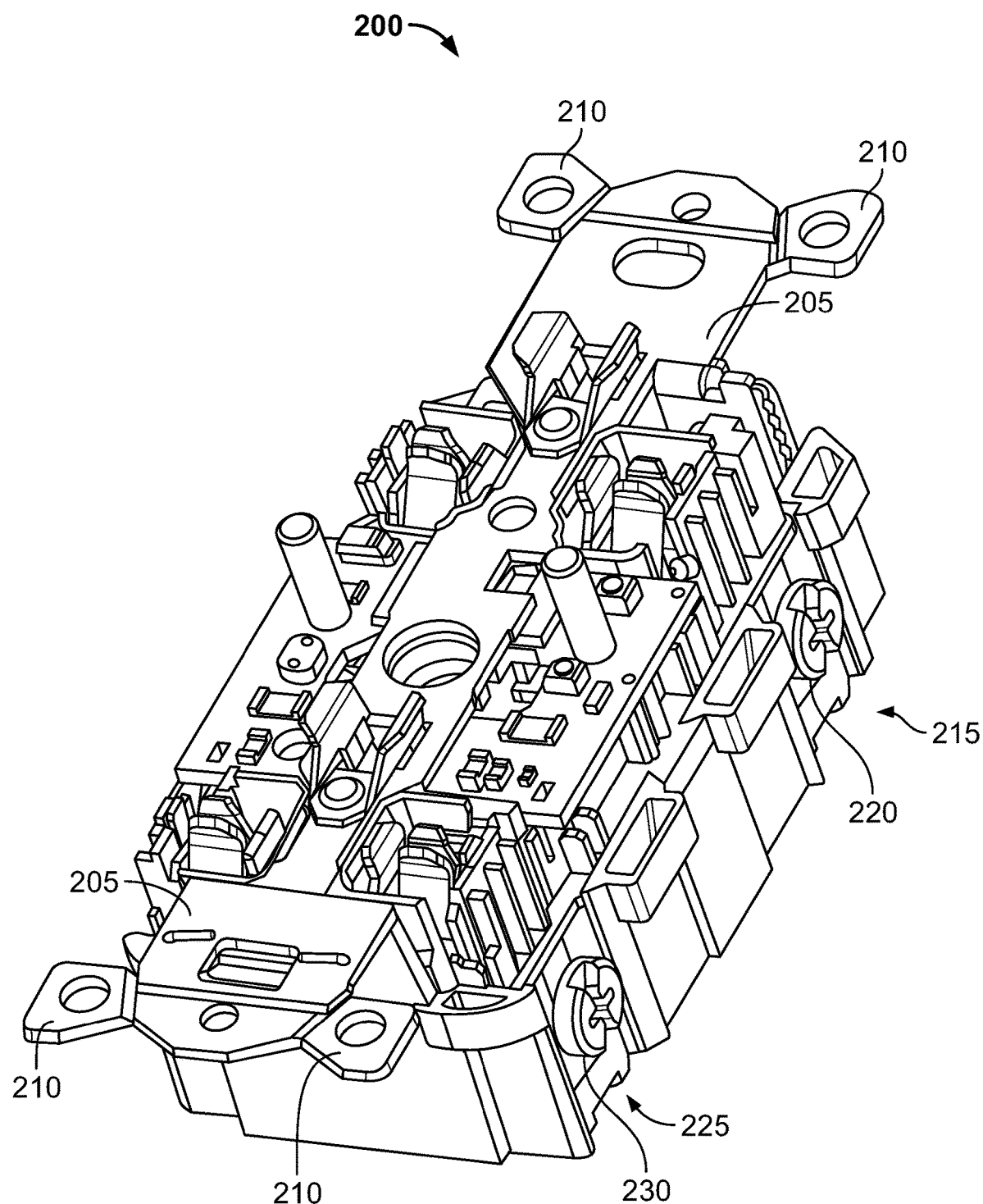
FIG. 4 is a perspective view of a rear cover of the outlet of FIG. 3 according to some embodiments.

As illustrated in FIG. 4, the receptacle portion 120 may further include a rear cover 200. In the illustrated embodiment, the rear cover 200 includes ground yoke/bridge assembly 205 includes mounting ears 210 protruding from the ends of the receptacle assembly 205. In operation, the mounting ears 210 are configured to physically connect the receptacle portion 120, and thus the charging system 100, to an electrical box. In some embodiments, the receiving portion 115 may also include a rear cover 200. In such an embodiment, the charging system 100 may be configured to be coupled to a double gang junction box.

The rear cover 200 includes line screw receptacle 215 configured to receive a line screw 220 and a neutral screw receptacle 225 configured to receive a neutral screw 230. In some embodiments, the rear cover 200 further includes a ground screw receptacle and a ground screw. In operation, a line, or hot line, may be electrically coupled to the charging system 100 via the line screw 220 while a neutral line may be electrically coupled to the charging system 100 via the neutral screw 230. Additionally, the charging system 100 may be electrically grounded via the ground screw. In some embodiments, the rear cover 200 may include additional line screw receptacles, line screws, neutral screw receptacles, and neutral screws.

Figure 5:
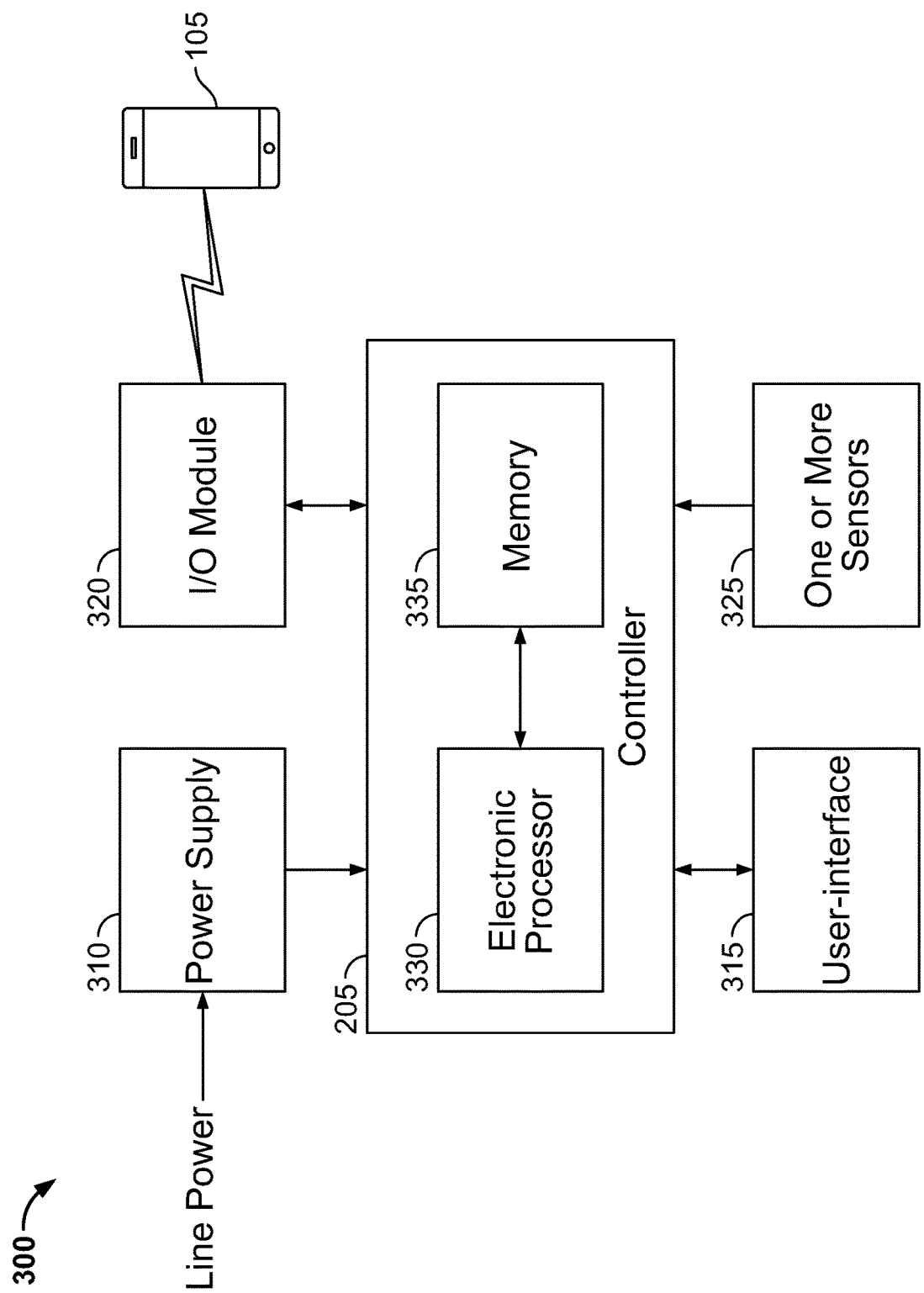
FIG. 5 is a block diagram of the control system of the charging systems of FIG. 1 and/or 3 according to some embodiments.

FIG. 5 is a block diagram illustrating a control system 300. The control system 300 includes a controller 305. The controller 305 is electrically and/or communicatively connected to a variety of modules or components of the charging system 100. For example, the controller 305 is connected to a power supply 310, a user-interface 315, an input/output (I/O) module 320, and one or more sensor 325.

In some embodiments, the controller 305 includes a plurality of electrical and electronic components that provide power, operational control, and protection to the components and modules within the controller 305 and/or the charging system 100. For example, the controller 305 includes, among other things, an electronic processor 330 (for example, a microprocessor or another suitable programmable device) and the memory 335.

The memory 335 includes, for example, a program storage area and a data storage area. The program storage area and the data storage area can include combinations of different types of memory, such as read-only memory (ROM), random access memory (RAM). Various non-transitory computer readable media, for example, magnetic, optical, physical, or electronic memory may be used. The electronic processor 330 is communicatively coupled to the memory 335 and executes software instructions that are stored in the memory 335, or stored on another non-transitory computer readable medium such as another memory or a disc. The software may include one or more applications, program data, filters, rules, one or more program modules, and other executable instructions.

Power supply 310 is configured to supply nominal power to the controller 305 and/or other components of the charging system 100. As illustrated, in some embodiments, the power supply 310 receives line power (for example, alternating-current (AC) line power via the line receptacle), converts the line power to a nominal power (for example, a nominal direct-current (DC) power), and provides the power to the controller 305. In other embodiments, the power supply 310 may include DC-DC converters, AC-DC converters, DC-AC converters, and/or AC-AC converters. In some embodiments, the power supply 310 outputs a nominal power to the device 105 in order to charge device 105. In some embodiments, the device 105 is wirelessly charged. In other embodiments the device 105 is charged via a wire.

The user-interface 315 is configured to output information concerning the charging system 100. In some embodiments, the user-interface 315 includes an indicator 340. In such an embodiment, indicator 340 may be configured to illuminate at using one or more colors. For example, indicator 340 may be configured to illuminate at a first color (for example, red), a second color (for example, yellow), and a third color (for example, blue or green). In yet another embodiment, the user-interface 315 may include a display (e.g., a primary display, a secondary display, etc.) and input devices such as touch-screen displays, a plurality of knobs, dials, switches, buttons, etc. The display is, for example, a liquid crystal display ("LCD"), a light-emitting diode ("LED") display, an organic LED ("OLED") display, an electroluminescent display ("ELD"), a surface-conduction electron-emitter display ("SED"), a field emission display ("FED"), a thin-film transistor ("TFT") LCD, etc.

The I/O module 320 is configured to provide communication between the charging system 100 an external device (for example, external device 105 and/or other external devices). In such an embodiment, the charging system 100 may communicate with the one or more outside devices through a network. The network is, for example, a wide area network (WAN) (e.g., the Internet, a TCP/IP based network, a cellular network, such as, for example, a Global System for Mobile Communications [GSM] network, a General Packet Radio Service [GPRS] network, a Code Division Multiple Access [CDMA] network, an Evolution-Data Optimized [EV-DO] network, an Enhanced Data Rates for GSM Evolution [EDGE] network, a 3GSM network, a 4GSM network, a Digital Enhanced Cordless Telecommunications [DECT] network, a Digital AMPS [IS-136/TDMA] network, or an Integrated Digital Enhanced Network [iDEN] network, etc.). In other embodiments, the network is, for example, a local area network (LAN), a neighborhood area network (NAN), a home area network (HAN), or personal area network (PAN) employing any of a variety of communications protocols, such as Wi-Fi, Bluetooth, ZigBee, etc. In yet another embodiment, the network includes one or more of a wide area network (WAN), a local area network (LAN), a neighborhood area network (NAN), a home area network (HAN), or personal area network (PAN).

The one or more sensors 325 are configured to sense one or more characteristics of the charging system 100 and/or device 105. In some embodiments, the one or more sensors 325 include a voltage sensor, a current sensor, and/or a temperature sensor. In some embodiments, the one or more sensors 325 are configured to sense a charging voltage and/or current output to the device 105. In some embodiments, the one or more sensors 325 are configured to sense voltage and/or current of a received line power.

In one exemplary operation, the device 105 may be placed in the receiving portion 115. Once placed in the receiving portion 115, the charging system 100 may begin charging (for example, via wirelessly charging) the device 105. During charging, one or more characteristics of the device 105 and/or the charging system 100 may be sensed via one or more sensors 325. The controller 305 may receive the one or more sensed characteristics and determine, based on the one or more sensed characteristics, a charging efficiency (for example, a Faraday efficiency and/or faradaic efficiency) and/or a charging strength. In some embodiments, the charging efficiency and/or the charging strength may be determined based on the power received by the device 105 from the charging system 100.

The charging efficiency and/or charging strength may be output to the user-interface 315. In some embodiment, the indicator 340 is illuminated based on the charging efficiency and/or charging strength. For example, the indicator 340 may be illuminated at: (1) a first color (for example, a red color) when the charging efficiency and/or charging strength is low; a second color (for example, a yellow color) when the charging efficiency and/or charging strength is medium; and a third color (for example, a blue or green color) when the charging efficiency and/or charging strength is strong. In other embodiments, the charging efficiency and/or charging strength may be output to a display of the user-interface 315 in the form of text. In yet another embodiment, the charging efficiency and/or charging strength may be output to an external device (for example, external device 105 and/or other external devices), via the I/O module 320 for display on the external device.

Figure 6:
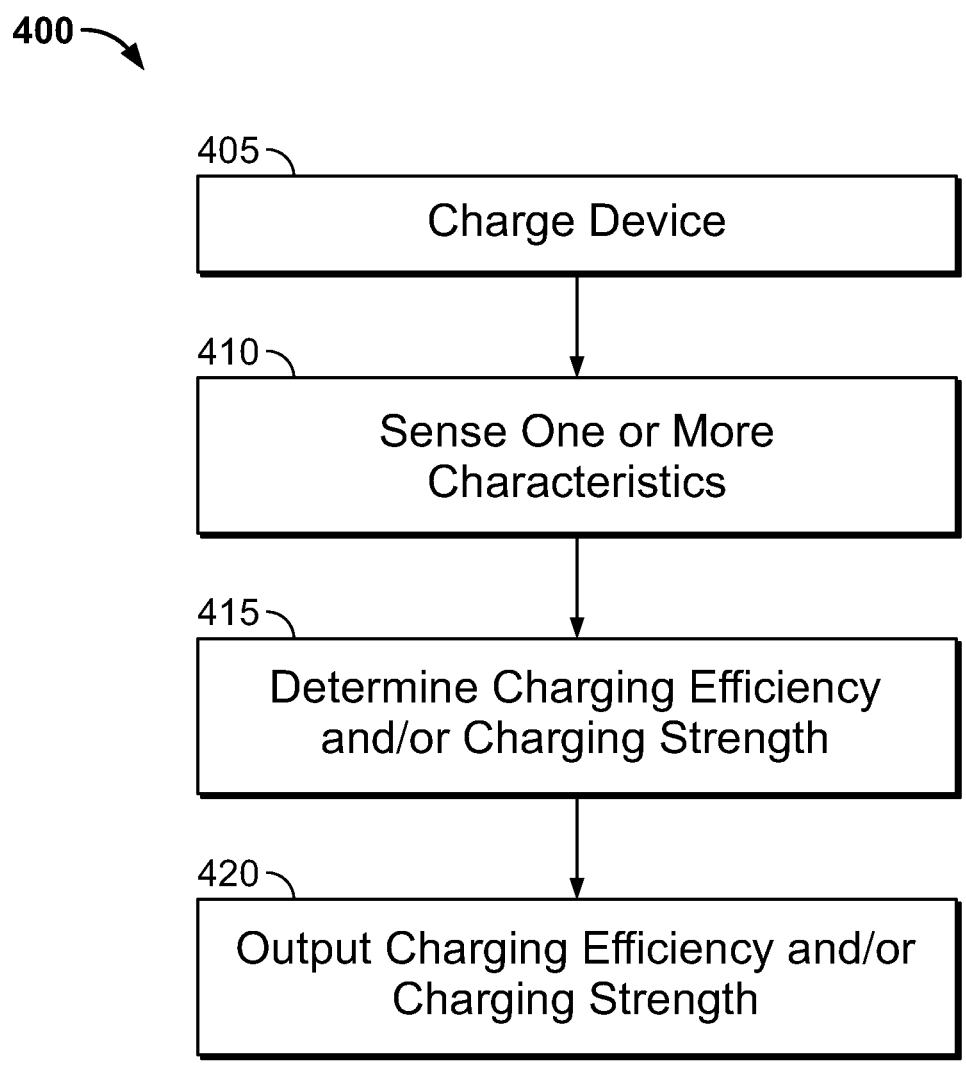
FIG. 6 is a flowchart illustrating an operation of the charging systems of FIG. 1 and/or 3 according to some embodiments.

FIG. 6 is a flowchart illustrating a process, or operation, 400 of the charging system 100. Operation 400 may be performed by controller 305. It should be understood that the order of the steps disclosed in method 400 could vary. Additional steps may also be added to the control sequence and not all of the steps may be required. Once the device 105 is received by the receiving portion 115, power is provided to the device 105 and the device is charged (block 405). As the device charges, one or more characteristics are sensed (block 410). The one or more characteristics are used to determine a charging efficiency and/or strength (block 415). The charging efficiency and/or strength are then output (block 420). In some embodiments the charging efficiency and/or strength is output to the user-interface 315. In such an embodiment, the indicator 340 may illuminate at the first color, the second color, or the third color based on the charging efficiency and/or strength. In another embodiment, the charging efficiency and/or strength may be output to an external device via the I/O module 320.

Figure 7:
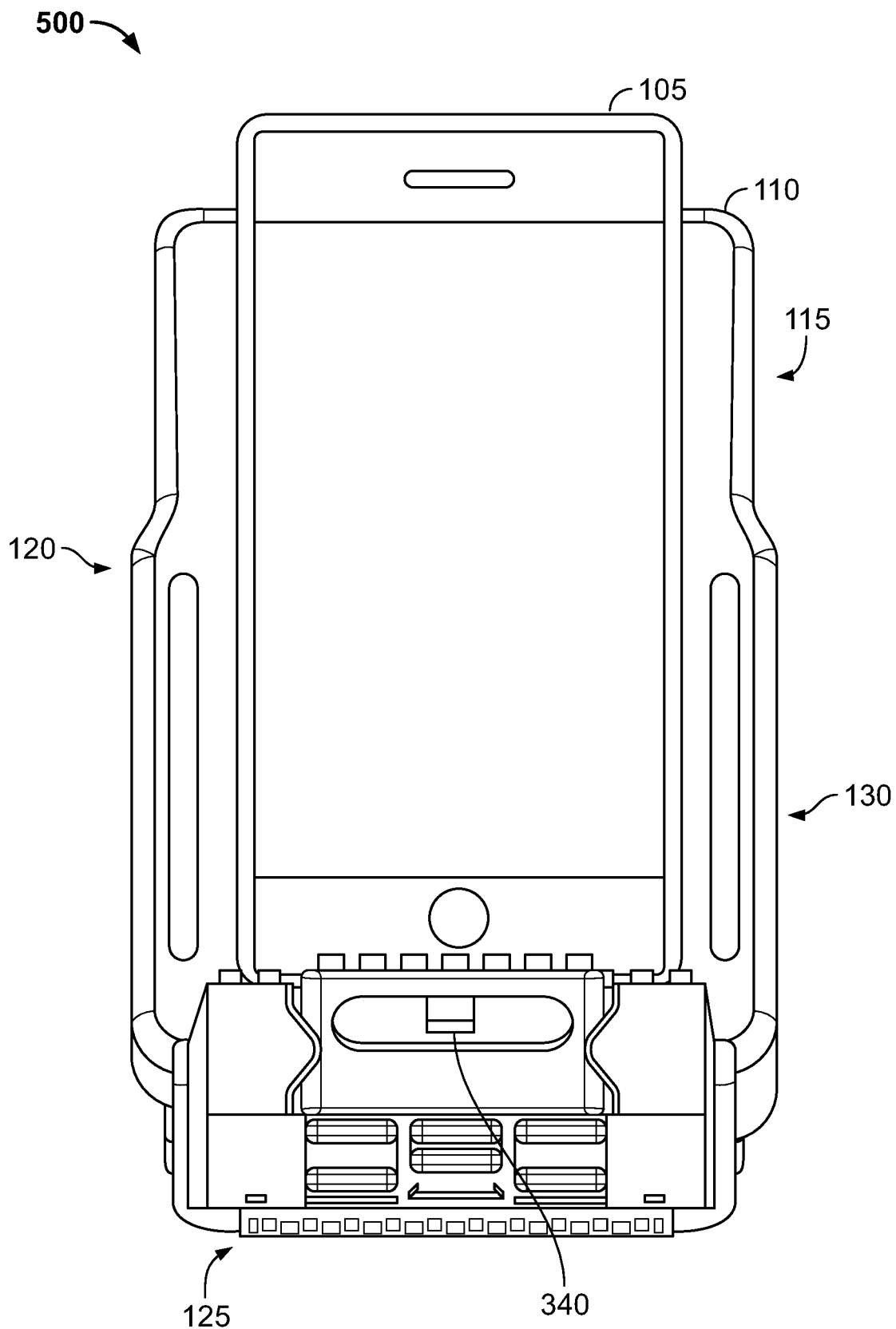
FIG. 7 is a front perspective view of a charging system configured to charge a device according to some embodiments.

FIG. 7 illustrates a charging system 500 according to another embodiment. As illustrated, charging system 500 is a single-gang system. In such an embodiment, the charging system 500 includes similar components as charging system 100, including a rear cover 200 located at a back portion of the receiving portion 115. The charging system 500 may be configured to electrically and/or physically connect to a single-gang junction box.

Figure 8:
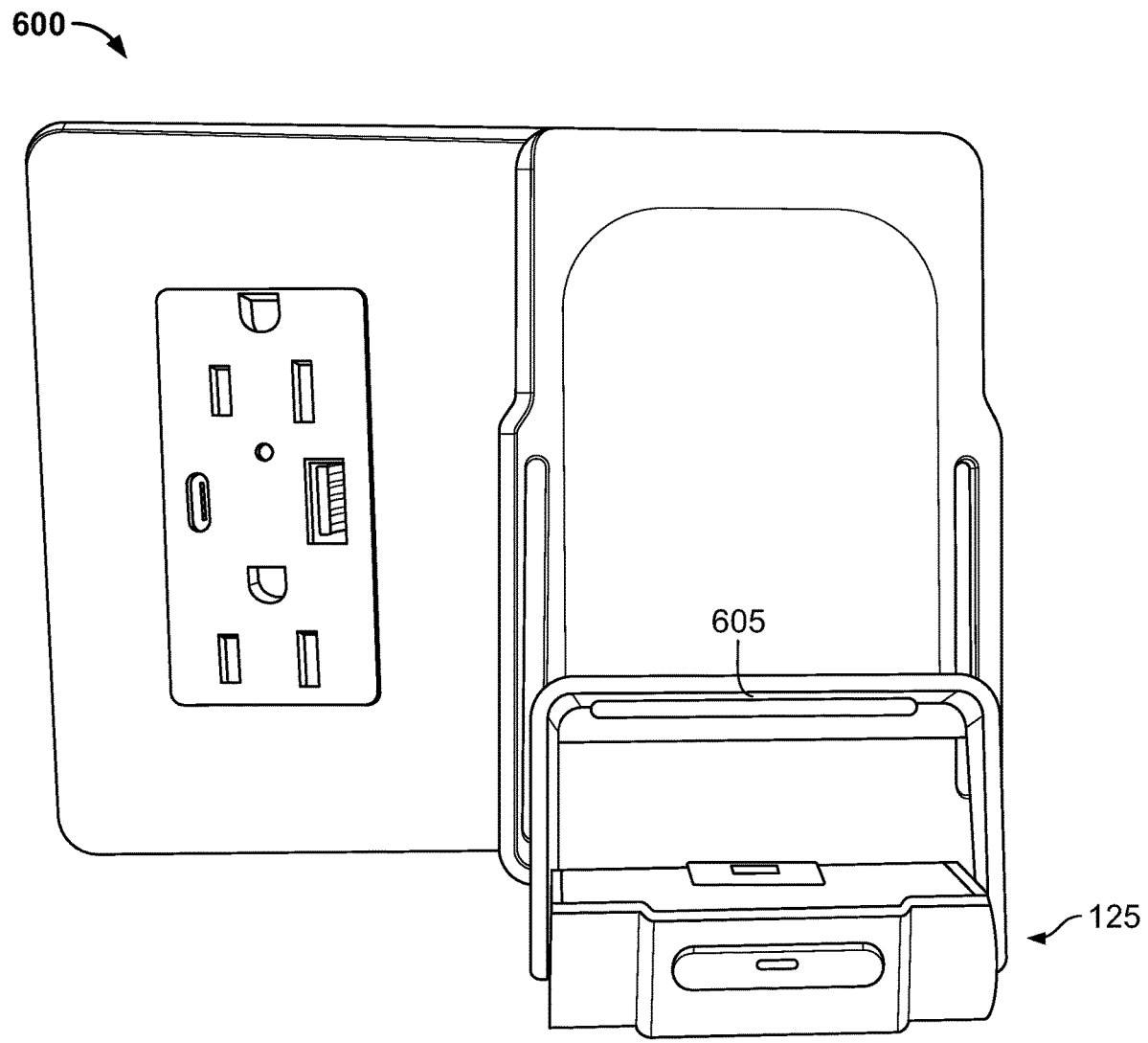
FIG. 8 is a front perspective view of a charging system including a retaining member according to some embodiments.
Figure 9A:
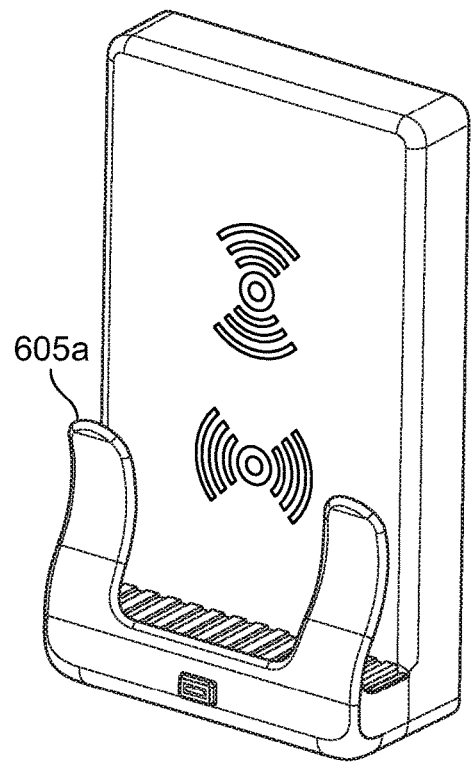
FIGS. 9A-9D are front perspective views of charging systems including various embodiments of retaining members.
Figure 9B:
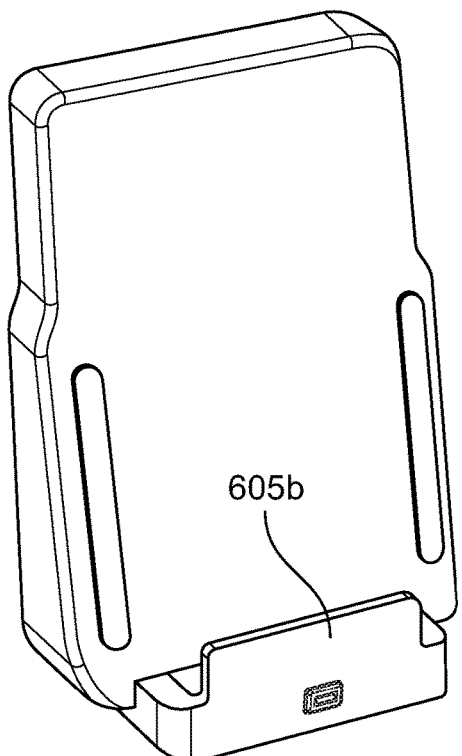
Figure 9C:
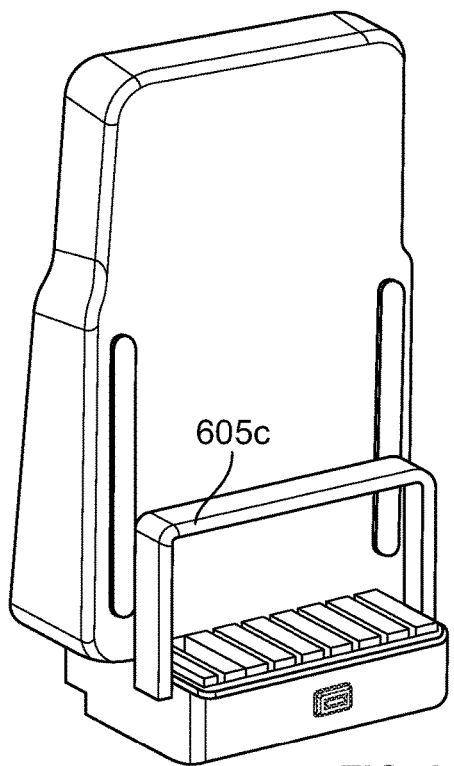
Figure 9D:
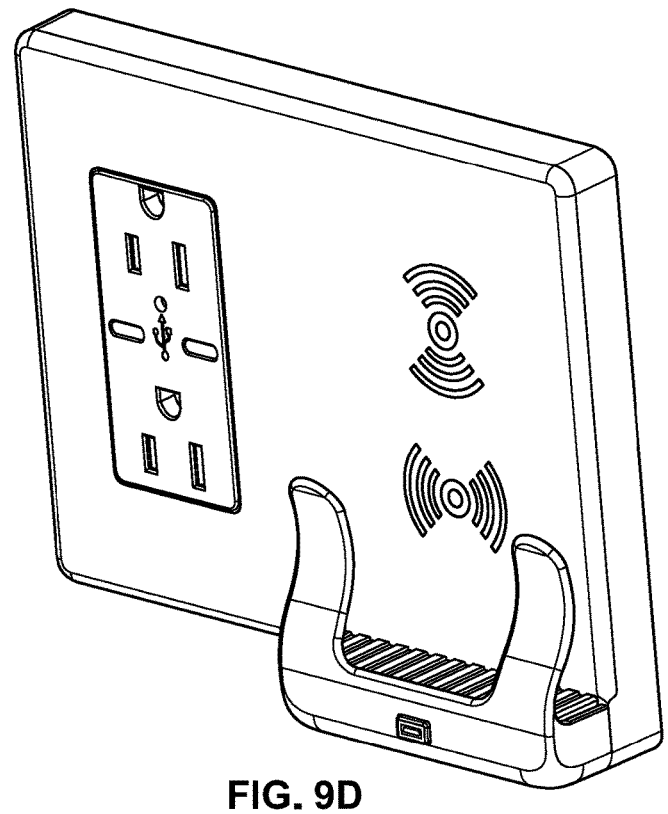

FIG. 8 illustrates a charging system 600 according to another embodiment. In the illustrated embodiment, charging system 600 includes similar components as charging system 100. Charging system 600 may further includes a retaining member 605. Retaining member 605 may be rotatably coupled to the shelf 125. The retaining member 605 may be configured to rotate toward the device 105 in order to secure the device 105 in the receiving portion 115. The retaining member 605 may be further configured to rotate away from the device 105 in order to allow removal of the device 105 from the receiving portion 115. In some embodiments, the retaining member 605 is biased (for example, via a biasing member) so to secure device 105 against the housing 110. FIGS. 9A-9C illustrates various embodiments of retaining members 605a-605c of the charging system 600.

Figure 10:
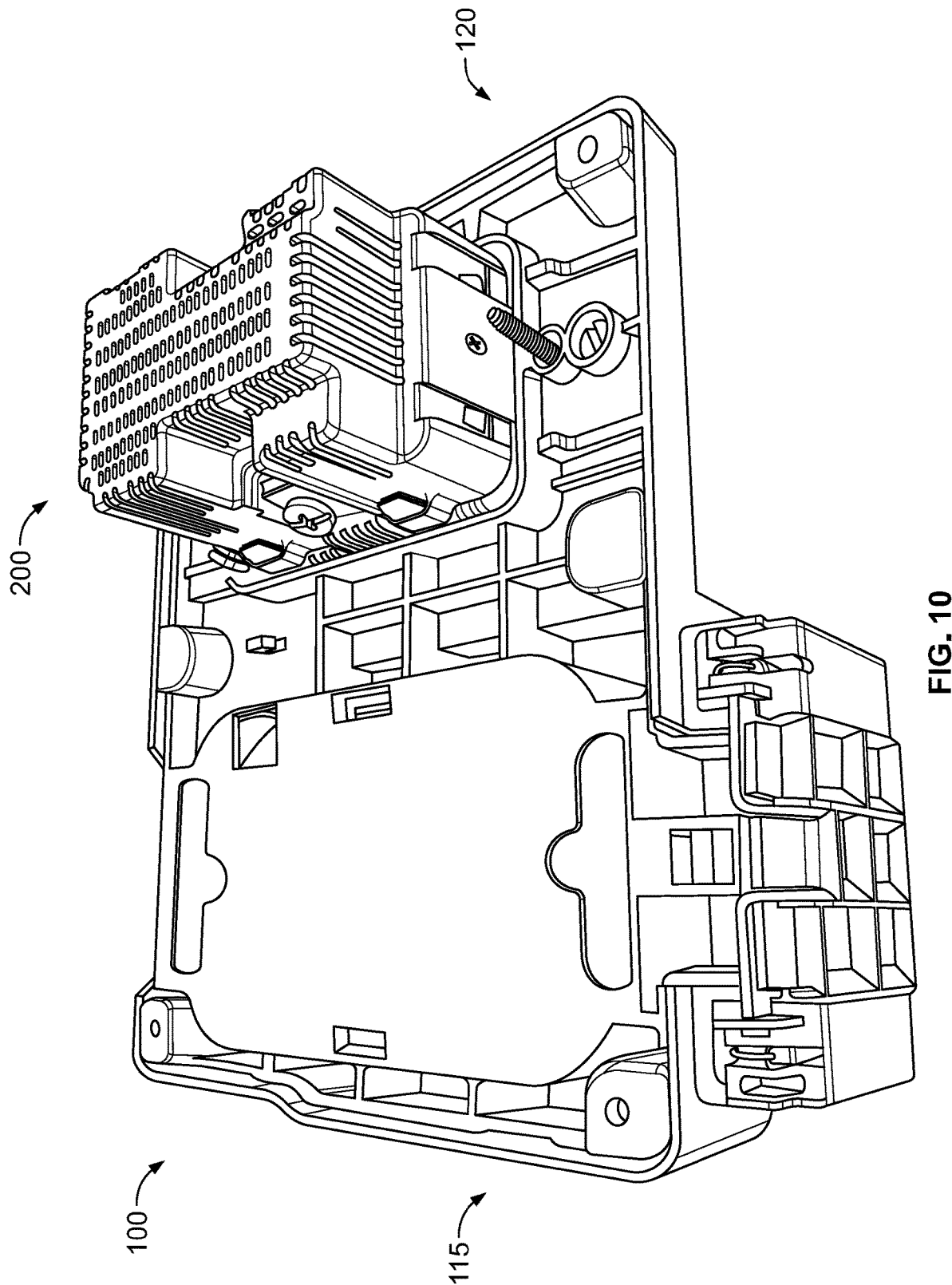
FIG. 10 is a rear perspective view of a charging system configured to charge a device according to some embodiments.
Figure 11:
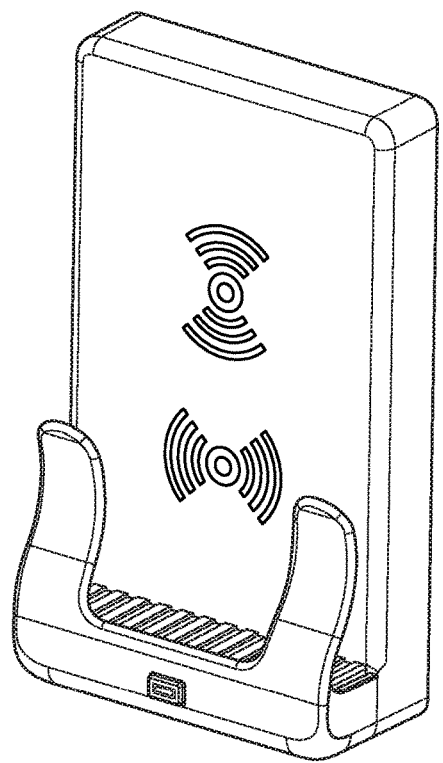
Fig. 11 is a front perspective view of a charging system configured to charge a device according to some embodiments.
Figure 12:
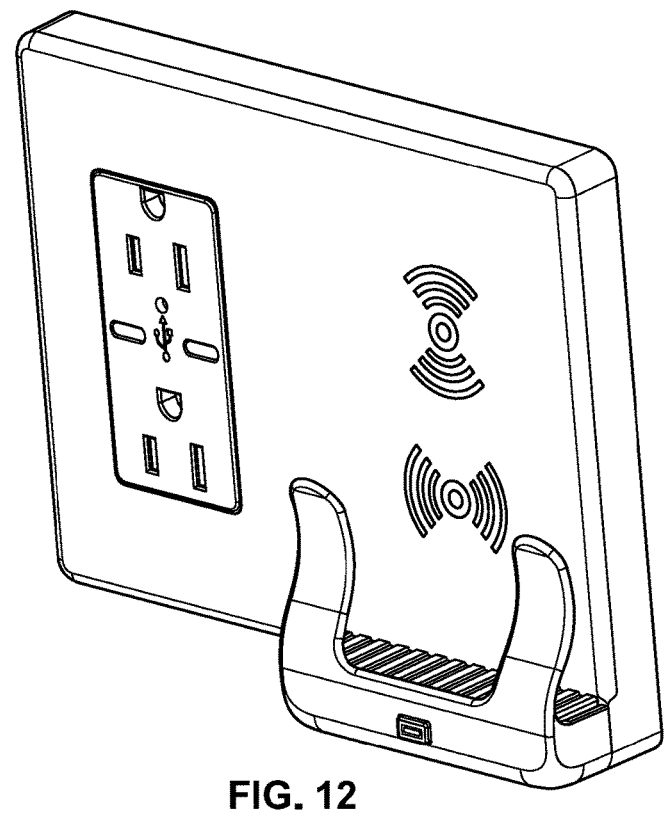
Fig. 12 is a front perspective view of a charging system configured to charge a device according to some embodiments.

FIG. 10 illustrates a rear view of the charging system 100 according to some embodiments. In the illustrated embodiment, charging system 100 includes a single rear cover for electrically and/or physically connecting the charging system 100 to a single gang junction box. In such an embodiment, the receiving portion 115 is physically located adjacent the single gang junction box when the charging system 100 is installed.

Thus, the application provides, among other things, a system and method for charging a device and outputting a charging efficiency and/or charging strength. Various features and advantages of the application are set forth in the following claims.

I claim:

1. A charging system comprising
    a housing including a receiving portion having a shelf projecting perpendicular from the receiving portion, the shelf configured to provide a surface for placement of the external device, the shelf having a first side, a front side perpendicular to the first side, and a second side perpendicular to the front side and opposite the second side;
    an indicator located on a front portion of the shelf, the indicator configured to illuminate at a first color, a second color, and a third color;
    a power supply located within the housing, the power supply configured to wirelessly charge a battery of an external device when the external device is received by the receiving portion;
    a retaining member rotatably coupled to the shelf, the retaining member having a substantially-U shape and being rotatably coupled to the shelf, the retaining member including a first arm rotatably coupled at the first side of the shelf, a second arm rotatably coupled at the second side of the shelf, and a retaining portion configured to retain the external device against the receiving portion, the retaining portion being substantially perpendicular to the first portion and the second portion and substantially parallel to the shelf, wherein the retaining member further includes an opening created by the first arm, the second arm, and the retaining portion such that a display of the external device is visible through the opening; and
    a controller configured to
        determine a charging efficiency of the external device, and
        output a signal indicative of the charging efficiency to the external device, wherein the charging efficiency is displayed via the display of the external device.

2. The charging system of claim 1, wherein the housing further includes a line terminal configured to electrically connect to a line and receive line power.

3. The charging system of claim 1, wherein the housing is configured to couple to a receptacle junction box.

4. The charging system of claim 3, wherein the receptacle box is a single-gang junction box.

5. The charging system of claim 3, wherein the receptacle box is a double-gang junction box.

6. The charging system of claim 5, wherein the housing further includes a receptacle.

7. The charging system of claim 1, wherein the charging efficiency is based on a power output from the power supply to the external device.

8. The charging system of claim 1, wherein the external device is a smartphone.

9. A method of charging a device, the method comprising:
    wirelessly charging a device when the device is received by a receiving portion of a housing, wherein the receiving portion includes a shelf projecting perpendicular from the receiving portion, the shelf configured to provide a surface for placement of the external device, the shelf including an indicator configured to output at least a first color, a second color, and a third color;
    sensing a characteristic when the device is charging;
    determining a charging strength based on the characteristic; and
    outputting a signal indicative of the charging efficiency to the external device, wherein the charging efficiency is displayed via the external device;
    wherein a retaining member is rotatably coupled to the shelf, the retaining member having a substantially-U shape, the retaining member including a first arm rotatably coupled at the first side of the shelf, a second arm rotatably coupled at the second side of the shelf, and a retaining portion configured to retain the external device against the receiving portion, the retaining portion being substantially perpendicular to the first portion and the second portion and substantially parallel to the shelf, wherein the retaining member further includes an opening created by the first arm, the second arm, and the retaining portion such that a display of the external device is visible through the opening.

10. The method of claim 9, wherein the device is wirelessly charge via line power received via a line terminal.

11. The method of claim 9, wherein the charging efficiency is output to an indicator.

12. The method of claim 9, wherein the charging strength is based on a power output from the power supply to the external device.

13. The method of claim 9, wherein the device is a smartphone.

* * * * *